United States Patent
Walsh

(10) Patent No.: US 7,655,731 B2
(45) Date of Patent: Feb. 2, 2010

(54) SOFT POLYMER COMPOSITIONS HAVING IMPROVED HIGH TEMPERATURE PROPERTIES

(75) Inventor: David J. Walsh, Chadds Ford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 168 days.

(21) Appl. No.: 11/506,553

(22) Filed: Aug. 18, 2006

(65) Prior Publication Data

US 2007/0049682 A1   Mar. 1, 2007

Related U.S. Application Data

(60) Provisional application No. 60/713,438, filed on Sep. 1, 2005.

(51) Int. Cl.
  *C08L 23/22* (2006.01)
  *C08L 31/04* (2006.01)
(52) U.S. Cl. .......................... 525/222; 525/93; 525/192; 525/240; 525/232; 525/227
(58) Field of Classification Search ................. 525/222, 525/93, 192, 240, 232, 227
  See application file for complete search history.

(56) References Cited

U.S. PATENT DOCUMENTS

| 4,234,656 A |   | 11/1980 | Amembal |
|---|---|---|---|
| 4,500,681 A | * | 2/1985 | Shulman ..................... 525/222 |
| 4,710,544 A | * | 12/1987 | Wolfe, Jr. ................... 525/194 |
| 5,532,066 A |   | 7/1996 | Latiolais et al. |

FOREIGN PATENT DOCUMENTS

| EP |   | 0964890 B1 |   | 10/2004 |
|---|---|---|---|---|
| JP |   | 63041550 A | * | 2/1988 |
| JP |   | 6329744 A |   | 11/1994 |
| WO |   | WO 01/12390 A1 |   | 2/2001 |

* cited by examiner

*Primary Examiner*—Robert D. Harlan

(57) ABSTRACT

Disclosed are soft polymer compositions comprising an ethylene/alkyl (meth)acrylate copolymer and a crystalline polyolefin, such as polypropylene homopolymers or polypropylene copolymers, wherein the ethylene/alkyl (meth)acrylate copolymer has a higher melt viscosity than the polyolefin. Also disclosed are such compositions modified by materials that improve the scratch-and-mar properties of the blends, the preparation and use of these compositions in such processes as extrusion and injection molding, and articles made from these compositions.

10 Claims, No Drawings

SOFT POLYMER COMPOSITIONS HAVING IMPROVED HIGH TEMPERATURE PROPERTIES

The application claims priority to U.S. provisional application No. 60/713,438, filed Sep. 1, 2005, the entire disclosure of which is incorporated herein by reference.

This invention relates to a soft polymer composition comprising an ethylene/alkyl (meth)acrylate copolymer and a crystalline polyolefin, such as polypropylene homopolymer or polypropylene copolymer and to the preparation and use of the composition.

BACKGROUND OF THE INVENTION

Blends of an ethylene/alkyl acrylate copolymer with an ethylene/propylene copolymer having a melting point greater than 100° C., or polypropylene with an ethylene/ethyl acrylate copolymer in the presence of a peroxide have been disclosed. See, e.g., Japanese Patent Application JP6329744A and U.S. Pat. No. 4,234,656.

Thermoplastic elastomer compositions made by dynamic crosslinking have also been disclosed. See, e.g., U.S. Pat. No. 4,710,544 and EP0964890 B1.

It is desirous to develop a new composition that maintains the preparation simplicity of an unmodified blend, but has an improved high temperature performance approaching that achievable in compositions where the compositions have been reactively modified by a crosslinking process.

SUMMARY OF THE INVENTION

This invention provides a composition comprising (a) a blend of from about 20 to about 50 weight % of at least one crystalline polyolefin and from about 50 to about 80 weight % of at least one ethylene/alkyl (meth)acrylate copolymer with a higher melt viscosity than the polyolefin (at an apparent shear rate of about 1,000 $sec^{-1}$). The composition optionally has a Shore D hardness of less than 50 comprising a blend of from 25 to 45 weight % of at least one polypropylene homopolymer or polypropylene copolymer; and from 55 to 75 weight % of at least one ethylene/alkyl acrylate copolymer with a higher melt viscosity (at an apparent shear rate of about 1,000 $sec^{-1}$) than the polyolefin, preferably wherein the ratio of the melt viscosity of the ethylene/alkyl acrylate copolymer to the melt viscosity of the polyolefin is greater than 1.25, more preferably greater than 1.5.

This invention also provides blends wherein the composition described above further comprises (b) from about 1 to about 10 weight % of one or more components that can improve the scratch-and-mar properties of the composition.

This invention also provides blends wherein the composition described above further comprises (c) from 0.01 to 20 weight % of at least one additional component selected from the group consisting of plasticizers, stabilizers, antioxidants, UV absorbers, antistatic agents, dyes, pigments or other coloring agents, fluorescent whitening agents, inorganic fillers, delustrants, terminating agents, fire-retardants, lubricants, reinforcing agents, foaming or blowing agents, processing aids, slip additives, antiblock agents, release agents and tackifying resins, or combinations of two or more thereof.

This invention also provides articles prepared from the compositions described above; including articles such as films, multilayer laminates, extruded sheets, coated fabrics, and articles that can be shaped by injection molding, extrusion molding, profile-extrusion or thermoforming.

DETAILED DESCRIPTION OF THE INVENTION

All references disclosed herein are incorporated by reference.

"Copolymer" means polymers containing two or more different monomers.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes. Melt flow rates (MFR) are measured in a similar way but at a different temperature, herein at 230° C., which is required due to the proximity of the melting point of polypropylene. Viscosities of polymers can be measured by means of a capillary rheometer. Viscosities reported herein are measured according to ASTM D3835 using a Dynisco LCR7001 capillary rheometer fitted with a 9.55-mm diameter barrel, at a temperature of 230° C. The apparent shear rate is characterized herein as "about 1,000 $sec^{-1}$," corresponding to a reading of 1,002.3 $sec^{-1}$ on that rheometer.

The limit of high temperature properties of a material can be measured in different ways, such as by the deflection of a beam under a given load, or by the indentation of a "foot" into a block of material under a load. The heat deflection temperature (HDT), according to ASTM D648, involves loading the mid-point of a span in a 3-point bending device under a choice of loads and different heating rates, and measures the temperature at which the deflection at the center of the bar reaches 125 microns (µ). The Vicat temperature determines the temperature at which a standard indenter penetrates one mm below the surface of a test specimen under a given load at a specified heating rate. Vicat temperatures reported herein are measured according to ASTM D1525 with a 10N load at 2° C. per minute.

Of note are compositions as described herein wherein the composition has a Vicat temperature of at least 60° C., preferably greater than 65° C.

However, these methods do not give a true indication of the temperature resistance of very soft materials since the modulus may be such that a significant deformation of the sample takes place even though little or no creep has taken place in the material itself. An example is the HDT test. It may be useful to look at the temperature at which higher deflections take place up to the point where the material loses all its strength. Herein, heat deflection temperatures are compared by testing a sample with a span of 50 mm, and a height of 6.35 mm, with a 16.5 psi (0.116 MPa) load at a heating rate of 2° C./min to a deflection of 500µ. This is referred to as a "modified HDT" test.

Of note are compositions as described herein wherein a molded sample of the composition with a height of 6.35 mm, with a 16.5 psi (0.116 MPa) load at the mid-point of a 50-mm span in a 3-point bending device, at a heating rate of 2° C./min, deflects to 500µ at temperatures greater than 60, or greater than 70° C.

Others working with soft materials (see U.S. Pat. No. 6,506,842) have defined an "upper service temperature" (UST) as that temperature at which a thermomechanical analyzer (TMA) penetration probe, of 0.89 mm contact diameter, penetrates a specimen having a thickness of about three millimeters to a depth of 900 micrometers. A suitable TMA is produced by TA Instruments Inc. A force of one Newton is applied to the probe as it rests on the surface of the specimen, in a chamber where the temperature is ramped at a rate of 5°

C./min. The UST documents the point where the material has lost most of its resistance to deformation, with an upper limit that approaches the melting point of the material.

Of note are compositions as described herein wherein a molded sample of the composition having a thickness of about 3 mm, heated in a chamber at a rate of 5° C./min, is penetrated by a probe of 0.89 mm contact diameter with an applied force of one Newton to a depth of 900 micrometers at temperatures greater than 105, greater than 120, or greater than 140° C.

A composition comprises a blend of at least one crystalline polyolefin, such as polypropylene, and at least one ethylene/alkyl (meth)acrylate copolymer having higher melt viscosity than the polyolefin. The polyolefin, such as polypropylene homopolymer or polypropylene copolymer, is the minor component, and yet, by virtue of the difference in viscosities of the two polymers, is not present as discrete droplets. The composition approaches a structure in which the two polymers are co-continuous. This is evidenced by transmission electron micrographs where the polypropylene phase is seen to have a very large aspect ratio, or even where it is impossible to decide if the polypropylene is in fact continuous or not. In this way the structure contributes significantly to the properties of the blend, especially at high temperatures.

Polypropylene (PP) polymers can include homopolymers, random copolymers, block copolymers and terpolymers of propylene. Copolymers include copolymers of propylene with other olefins such as ethylene, 1-butene, 2-butene and the various pentene isomers, etc. and notably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymers of propylene and ethylene. The term "polypropylene" when used herein is used generically to refer to any or all of the polymers comprising propylene described above. Preferably, the polypropylenes used herein have a melting point above 100° C., more preferably above 130° C.

Polypropylenes disclosed can be manufactured by any known process. For example, polypropylene polymers can be prepared in the presence of Ziegler-Natta catalyst systems, based on organometallic compounds and on solids containing titanium trichloride.

Block copolymers can be manufactured similarly, except that propylene is generally first polymerized by itself in a first stage and propylene and additional comonomers such as ethylene are then polymerized, in a second stage, in the presence of the polymer obtained during the first. Each of these stages can be carried out, for example, in suspension in a hydrocarbon diluent, in suspension in liquid propylene, or else in gaseous phase, continuously or noncontinuously, in the same reactor or in separate reactors.

Additional information relating to block copolymers and to their manufacture may be found in chapters 4.4 and 4.7 of the work "Block Copolymers" edited by D. C. Allport and W. H. Janes, Applied Science Publishers Ltd (1973), which are incorporated by reference in the present description.

"(Meth)acrylate" and "alkyl (meth)acrylate" mean ester(s) of methacrylic acid and/or acrylic acid. "Ethylene/alkyl acrylate copolymer" includes copolymer of ethylene and at least one alkyl acrylate, preferably wherein the alkyl moiety contains from 1 to 12 carbon atoms. Examples of alkyl acrylates include methyl acrylate, ethyl acrylate and butyl acrylate. "Ethylene/methyl acrylate" means a copolymer of ethylene and methyl acrylate (EMA), "ethylene/ethyl acrylate" means a copolymer of ethylene and ethyl acrylate (EEA) and "ethylene/butyl acrylate" means a copolymer of ethylene and butyl acrylate (EBA).

The relative amount of the alkyl acrylate comonomer incorporated into ethylene/alkyl acrylate copolymers can vary broadly from a few weight percent (e.g., 2 or 5) up to as high as 40 weight percent of the total copolymer or even higher. The alkyl group varies from a simple methyl group up to a $C_{12}$ alkyl group with or without branching. The relative amount and choice of the alkyl group present in the alkyl acrylate ester comonomer can establish how and to what degree the resulting ethylene copolymer is to be viewed as a polar polymeric constituent in the thermoplastic composition.

The alkyl group in the alkyl (meth)acrylate comonomer preferably has from 1 to 4 carbon atoms and the alkyl (meth)acrylate comonomer can have a concentration range of (meth)acrylate monomer from 5 to 40, or from 10 to 35, weight percent in the ethylene/alkyl (meth)acrylate copolymer. For example, alkyl (meth)acrylate can be methyl acrylate, ethyl acrylate, butyl acrylate, or combinations of two or more thereof.

Ethylene/alkyl (meth)acrylate copolymers can be prepared by processes well known in the polymer art using either autoclave or tubular reactors. The copolymerization can be run as a continuous process in an autoclave: ethylene, the alkyl (meth)acrylate, and optionally a solvent such as methanol (see U.S. Pat. No. 5,028,674) are fed continuously into a stirred autoclave such as the type disclosed in U.S. Pat. No. 2,897,183, together with an initiator, the disclosures of which are incorporated herein by reference and the description of which is omitted herein for the interest of brevity. In some cases, it may be desirable to use a telogen such as propane, to control the molecular weight. The reaction mixture is continuously removed from the autoclave. After the reaction mixture leaves the reaction vessel, the copolymer is separated from the unreacted monomers and solvent (if solvent was used) by means such as vaporizing the nonpolymerized materials and solvent under reduced pressure and at an elevated temperature.

Tubular reactor produced ethylene/alkyl (meth)acrylate copolymer can be distinguished from the autoclave produced ethylene/alkyl (meth)acrylate as known in the art. The term or phrase "tubular reactor produced" ethylene/alkyl (meth)acrylate copolymer denotes an ethylene copolymer produced at high pressure and elevated temperature in a tubular reactor or the like, wherein the inherent consequences of dissimilar reaction kinetics for the respective ethylene and alkyl (meth)acrylate comonomers is alleviated or partially compensated by the intentional introduction of the monomers along the reaction flow path within the tubular reactor. Such a tubular reactor copolymerization produces a copolymer having a greater relative degree of heterogeneity along the polymer backbone (a more blocky distribution of comonomers), tends to reduce the presence of long chain branching, and produces a copolymer characterized by a higher melting point than one produced at the same comonomer ratio in a high pressure stirred autoclave reactor. Tubular reactor produced ethylene/alkyl (meth)acrylate copolymers are stiffer and more elastic than autoclave produced ethylene/alkyl (meth)acrylate copolymers.

Tubular reactor produced ethylene/alkyl acrylate copolymers are commercially available from E. I. du Pont de Nemours and Company, Wilmington, Del. (DuPont).

The actual manufacturing of the tubular reactor ethylene/alkyl (meth)acrylate copolymers are well known and the description thereof is omitted herein for the interest of brevity. See, e.g., U.S. Pat. Nos. 3,350,372; 3,756,996; and 5,532,066. See also Richard T. Chou, Mimi Y. Keating and Lester J. Hughes, "High Flexibility EMA made from High Pressure Tubular Process", Annual Technical Conference—Society of Plastics Engineers (2002), $60^{th}$(Vol. 2), 1832-1836.

The ethylene/alkyl acrylate copolymers can vary in melt index numerically in terms of a fraction (e.g., 0.1, 0.2, or 0.4) up to about 10. The specific selection of the grade of ethylene/alkyl acrylate copolymer component(s) to be used will be influenced by balancing factors such as viscosities, melt indices or melt flow rates, and melting points of the copolymer and the polypropylene.

The composition may optionally further comprise additive(s) (e.g., 1 to 10 wt %) that improve the scratch-and-mar performance of the compositions.

The compositions can also comprise additives including plasticizers, stabilizers including viscosity stabilizers, thermal stabilizers, ultraviolet (UV) stabilizers and hydrolytic stabilizers, primary and secondary antioxidants, UV absorbers, anti-static agents, dyes, pigments or other coloring agents, fluorescent whitening agents, inorganic fillers such as $CaCO_3$, delustrants such as $TiO_2$, terminating agents, fire-retardants, lubricants, reinforcing agents such as glass fiber and flakes, foaming or blowing agents, processing aids, slip additives, antiblock agents such as silica or talc, release agents, tackifying resins and/or mixtures thereof. See, e.g., Kirk Othmer *Encyclopedia of Chemical Technology*.

These additives may be present in the compositions of this invention in quantities from 0.01 to 20 weight % or 0.01 to 15 weight %, or 0.01 to 10 weight %. Many such additives may be present in from 0.01 to 5 weight %.

The optional incorporation of such additive(s) into the compositions can be carried out by any known process. This incorporation can be carried out, for example, by dry blending, by extruding a mixture of the various constituents, or the like.

The compositions of this invention are suitable for replacement for flexible polyvinyl chloride (f-PVC). Flexible PVC contains a plasticizer, typically a phthalate plasticizer, to enhance flexibility and softness. The plasticizer can migrate out of the PVC composition over time, decreasing flexibility and softness and potentially contaminating materials in contact with the composition. A desire for long-term flexibility and softness and concern about the environmental impact of halogenated polymers, such as f-PVC, make an alternative polymer to f-PVC desirable. In particular there is demand for materials in the Shore D hardness range of 35 to 45 that can perform over a range of temperatures similar to f-PVC. Flexible PVC often has a Vicat temperature in the range of 60 to 70° C., but also is known to maintain some strength up to much higher temperatures. Of note are compositions of this invention having Shore D hardness of from 35 to 45, optionally having vicat temperature of from 60 to 70° C.

Thermoplastic polyolefins including reactively modified polyolefin blends have been used in place of f-PVC in some applications, and the compositions of the present invention could be an alternative to them. The compositions of the present invention also have advantages compared to polyolefin-based blends in that the polarity of the acrylate copolymer may give superior properties in such areas as adhesion, paintability, and resistance to hydrocarbon solvents.

The composition may be formed into articles of manufacture such as parts, sheets, or other forms using any of a number of conventional procedures for processing polymeric materials. For example, the compositions can also be formed into films, multilayer laminates or extruded sheets, injection molded into shaped articles such as knobs or handles for appliances or consumer goods, used for profile-extruded articles such as tubing, or for coated fabrics or other film and sheet applications. The composition may also be used in thermoforming, such as those compositions with high melt strength. The compositions may be useful in the manufacture of automobile interior parts, automobile exterior parts, consumer goods with soft-touch grips, and consumer appliances with soft-touch surfaces. Other applications may be possible and are within the knowledge of those skilled in the art.

The following Examples are merely illustrative, and are not to be construed as limiting the scope of the invention described and/or claimed herein.

EXAMPLES

The compositions described herein were prepared by mixing the components on a 30 mm W&P twin-screw extruder. The product was strand cut and dried, and injection molded to give 3 inch by 3 inch by ⅛-inch (7.6 cm by 7.6 cm by 3.2 mm) plaques and ⅛-inch (3.2 mm) microtensile bars. Hardness (Shore D) was measured according to ASTM D-2240, and tensile properties, such as tensile strength and extension, according to ASTM D412.

Materials Used

EMA-1: Ethylene/alkyl acrylate copolymer (tubular) with 25 weight % methyl acrylate, a melting point of 88° C., a MI of 0.4 g/10 min and a viscosity of 262 Pa-s.

EMA-2: Ethylene/alkyl acrylate copolymer (tubular) with 24 weight % methyl acrylate, a melting point of 92° C., a MI of 2.0 g/10 min and a viscosity of 153 Pa-s.

EMA-3: Ethylene/alkyl acrylate copolymer (autoclave) with 23.5 weight % methyl acrylate, a melting point of 76° C., a MI of 1.0 g/10 min and a viscosity of 206 Pa-s.

EBA-1: Ethylene/alkyl acrylate copolymer with 35 weight % butyl acrylate, a melting point of 78° C., a MI of 1.0 g/10 min and a viscosity of 181 Pa-s.

PP-1: Polypropylene homopolymer with MFR of 3.0 g/10 min, a flexural modulus of 260,000 psi, a HDT at 0.455 MPa of 104° C., and a viscosity of 150 Pa-s; sold as Marlex HGH030, by Chevron Phillips Chemical Co.

PP-2: Polypropylene homopolymer with MFR of 0.65 g/10 min, a flexural modulus of 190,000 psi, a HDT at 0.455 MPa of 86° C., and a viscosity of 242 Pa-s; sold as Marlex HHX007, by Chevron Phillips Chemical Co.

PP-3: Polypropylene homopolymer with MFR of 12 g/10 min, a flexural modulus of 200,000 psi, a HDT at 0.455 MPa of 82.2° C., and a viscosity of 106 Pa-s; sold as Profax 1274 by Montell Co. (now Basell).

Polypropylene homopolymers had melting points of about 165° C.

PP4: Polypropylene copolymer with MFR of 8.0 g/10 min, a melting point of 142° C., a flexural modulus of 110,000 psi, and a viscosity of 120 Pa-s; sold as DS6D21 by Dow Chemical Co.

PP-5: Polypropylene copolymer with MFR of 5.0 g/10 min, a melting point of 134° C., a flexural modulus of 79,700 psi, and a viscosity of 137 Pa-s; sold as DS6D81 by Dow Chemical Co.

In the Tables below, the viscosity ratio was the viscosity of the ethylene/alkyl acrylate copolymer divided by the viscosity of the PP polymer.

Examples 1 to 6

|  | Example | | | | | |
|---|---|---|---|---|---|---|
|  | 1 | 2 | 3 | 4 | 5 | 6 |
| PP-1 (weight %) | 30 | 30 | 30 | 40 | — | — |
| PP-2 (weight %) | — | — | — | — | 30 | 40 |
| EMA-1 (weight %) | 70 | — | — | 60 | 70 | 60 |
| EMA-2 (weight %) | — | 70 | — | — | — | — |
| EMA-3 (weight %) | — | — | 70 | — | — | — |
| Viscosity ratio | 1.75 | 1.02 | 1.37 | 1.75 | 1.08 | 1.08 |
| Modified HDT (° C.) | 73.3 | 71.3 | 64.3 | 101.7 | 73.6 | 85.8 |
| Vicat (° C.) | 70.7 | — | 61.9 | 84.3 | 67.8 | 77.7 |
| UST (° C.) | 154.5 | 145.7 | 122.5 | 160.6 | 126.5 | 155.6 |
| Hardness Shore D | 41.6 | 41.4 | 40.2 | 49.4 | 38.4 | 47 |
| Tensile Strength psi | 2358 | 1984 | 2196 | 3182 | 2263 | 2678 |
| Extension % | 479 | 378 | 366 | 624 | 351 | 399 |

These compositions all had good high temperature properties at a relatively low hardness. Of note was a comparison between Example 1 and Example 2. EMA-1 has a higher viscosity than EMA-2, providing a higher viscosity ratio. As a result, Example 1 had somewhat better high temperature properties and improved tensile properties compared to Example 2. Example 3 showed an autoclave EMA with a viscosity ratio between the EMA-1 and EMA-2 used in Examples 1 and 2. The high temperature properties were lower than those of both Examples 1 and 2. This demonstrates that using a tubular reactor produced ethylene acrylate copolymer gave better results.

The polypropylene homopolymer PP-2, used in Examples 5 and 6, has a higher viscosity than PP-1 (used in Examples 1 and 4), resulting in a lower viscosity ratio. The tensile properties of Examples 5 and 6 are lower than the corresponding Examples 1 and 4. Example 1 and Example 5 have similar modified HDT and vicat temperatures, but Example 1 has a higher UST, providing a better range of service temperatures. Example 4 has high temperature properties superior to those of Example 6. Thus, the viscosity of PP-1 is low enough to cause better enhancement in properties in a 40/60 mix than in a 30/70 mix, compared to PP-2.

Examples 7, 8 C9 and C10

|  | Example | | | |
|---|---|---|---|---|
|  | 7 | 8 | C9 | C10 |
| PP-1 (weight %) | 30 | 40 | — | — |
| PP-2 (weight %) | — | — | 30 | 40 |
| EBA-1 (weight %) | 70 | 60 | 70 | 60 |
| Viscosity ratio | 1.21 | 1.21 | 0.75 | 0.75 |
| Modified HDT (° C.) | 65.9 | 89.4 | 65.7 | 76.2 |
| Vicat (° C.) | 62.4 | 75.3 | 58.8 | 67.4 |
| UST (° C.) | 140.2 | 159.8 | 95.7 | 132.6 |
| Hardness Shore D | 35 | 43.6 | 30.6 | 36.2 |
| Tensile Strength psi | 1915 | 2427 | 1807 | 2246 |
| Extension % | 406 | 456 | 348 | 362 |

Comparative Examples C9 and C10 were compositions in which the ethylene/alkyl acrylate had a lower viscosity than the polypropylene (see viscosity ratio). Comparison of Examples 7 and 8 with Examples C9 and C10 shows that improved high temperature properties were achieved using a higher viscosity ratio. Examples 7 and 8 also had good tensile properties.

Examples 11 to 14

|  | Example | | | |
|---|---|---|---|---|
|  | 11 | 12 | 13 | 14 |
| PP-3 (weight %) | 30 | 30 | 40 | 30 |
| EMA-1 (weight %) | 70 | — | — | — |
| EMA-2 (weight %) | — | 70 | 60 | — |
| EBA-1 (weight %) | — | — | — | 70 |
| Viscosity ratio | 2.47 | 1.44 | 1.44 | 1.32 |
| Modified HDT (° C.) | 88.7 | 82.5 | 113.8 | 73.8 |
| Vicat (° C.) | 70.7 | 68.8 | 81.7 | 61.4 |
| UST (° C.) | 137.1 | 129.0 | 134.1 | 123.2 |
| Hardness Shore D | 44.6 | 43.8 | 51.8 | 34.8 |
| Tensile Strength psi | 2781 | 2343 | 2805 | 1981 |
| Extension % | 547 | 446 | 486 | 450 |

Examples 11 to 14 show that using a polypropylene (PP-3) with a lower viscosity than PP-1 (also having a higher MFR) enhanced HDT due to higher viscosity ratios. See, e.g., Examples 11, 12 and 14 (comparable to Examples 1, 2 and 7, respectively) show 8 to 15° C. improvement in the modified HDT. The UST's were not as good, probably because the higher MFR material lost strength at a lower temperature (note that pure PP-3 had a lower heat deflection temperature than PP-1). These blends were characterized by maintaining good strength at lower temperatures and then having little physical integrity at temperatures approaching the upper service temperature due to the low strength of the PP-3.

Examples 15 to 19

|  | Example | | | | |
|---|---|---|---|---|---|
|  | 15 | 16 | 17 | 18 | 19 |
| PP-4 (weight %) | 30 | — | — | 40 | — |
| PP-5 (weight %) | — | 30 | 40 | — | 40 |
| EMA-1 (weight %) | 70 | 70 | 60 | — | — |
| EBA-1 (weight %) | — | — | — | 60 | 60 |
| Viscosity ratio | 2.18 | 1.91 | 1.91 | 1.51 | 1.32 |
| Modified HDT (° C.) | 74.4 | 65.6 | 75.8 | 83.8 | 73.2 |
| Vicat (° C.) | 66.1 | 62.5 | 70.0 | 68.5 | 65.0 |
| UST (° C.) | 121.8 | 109.4 | 117.4 | 126.5 | 121.3 |
| Hardness Shore D | 39.6 | 35.8 | 42.4 | 37.4 | 36.4 |

-continued

| | Example | | | | |
|---|---|---|---|---|---|
| | 15 | 16 | 17 | 18 | 19 |
| Tensile Strength psi | 2453 | 2305 | 2811 | 2170 | 2175 |
| Extension % | 546 | 523 | 605 | 513 | 523 |

Examples 15 to 19 show the results using polypropylene copolymers, which were softer than the homopolymers, contributing to lower Shore D hardness, but had lower melting points, which reduced high temperature properties of the resulting blends.

Examples 15 and 16 compared to Example 1. Example 15, with a higher viscosity ratio than Example 1, showed a lower Shore D and a higher HDT than Example 1. Example 16, with a viscosity ratio lower than that of Example 15, was softer but also had a lower HDT than Example 1.

Example 17 compared with Example 4. It was softer but also had a much lower HDT, vicat temperature and UST.

Examples 18 and 19 compared with Example 8 and both are much softer. Example 18 had reduced HDT, while Example 19 had significantly lower HDT than Example 8. The UST's of all of these blends were not as good as the blends containing homopolymers probably due to approaching the lower melting points of the copolymers used.

The Examples show the influence of the ratio of the ethylene/alkyl acrylate viscosity to the polypropylene viscosity on softness and high temperature properties of the resulting blend. They also show that appropriate selection of ethylene/alkyl acrylate copolymer and polypropylene homopolymer or copolymer according to viscosity as well as melting point may provide a tailored balance of properties.

The invention claimed is:

1. A composition comprising a blend and optionally a second component wherein
   the blend comprises 20 to 50 weight % of at least one crystalline polyolefin and 50 to 80 weight % of at least one ethylene/alkyl (meth)acrylate copolymer, the ethylene/alkyl (meth)acrylate copolymer is selected solely from the group consisting of ethylene/methyl acrylate copolymer, ethylene/ethyl acrylate copolymer, ethylene/butyl acrylate copolymer, and combinations of two or more thereof;
   the ratio of the melt viscosity of the ethylene/alkyl (meth) acrylate copolymer to the melt viscosity of the polyolefin is greater than 1.25:1; and
   the second component includes plasticizer, stabilizer, antioxidant, UV absorber, antistatic agent, dye, pigment or other coloring agent, fluorescent whitening agent, inorganic filler, delustrant, terminating agent, fire-retardant, lubricant, reinforcing agent, foaming or blowing agent, processing aid, slip additive, antiblock agent, release agent, tackifying resin, or combinations of two or more thereof.

2. The composition of claim 1 wherein the blend comprises 25 to 45 weight % of the polypropylene including polypropylene homopolymer or polypropylene copolymer and 55 to 75 weight % of the ethylene/alkyl-(meth)acrylate copolymer.

3. The composition of claim 2 wherein the ratio of the melt viscosity of the ethylene/alkyl (meth)acrylate copolymer to the melt viscosity of the propylene is greater than 1.5.

4. The composition of claim 2 wherein the composition has a Vicat temperature of at least 60° C.

5. The composition of claim 3 wherein the composition has a Vicat temperature of at least 65° C.

6. The composition of claim 2 wherein the alkyl (meth) acrylate is present in the ethylene/alkyl (meth)acrylate copolymer in a range from about 5 to about 40 weight %.

7. The composition of claim 4 wherein the alkyl (meth) acrylate is present in said ethylene/alkyl (meth)acrylate copolymer in a range from about 10 to about 35 weight %.

8. The composition of claim 5 wherein the alkyl (meth) acrylate is present in said ethylene/alkyl (meth)acrylate copolymer in a range from about 10 to about 35 weight %.

9. The composition of claim 6 wherein the ethylene/alkyl (meth)acrylate is a tubular reactor produced copolymer.

10. The composition of claim 8 wherein the ethylene/alkyl (meth)acrylate is a tubular reactor produced copolymer.

* * * * *

UNITED STATES PATENT AND TRADEMARK OFFICE
CERTIFICATE OF CORRECTION

| | | |
|---|---|---|
| PATENT NO. | : 7,655,731 B2 | Page 1 of 1 |
| APPLICATION NO. | : 11/506553 | |
| DATED | : February 2, 2010 | |
| INVENTOR(S) | : David J. Walsh | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this

Twenty-third Day of November, 2010

David J. Kappos
*Director of the United States Patent and Trademark Office*